Sept. 20, 1971  D. G. SCOTT  3,606,485
EMPTY-LOAD RELAY VALVE DEVICE
Filed Dec. 29, 1969
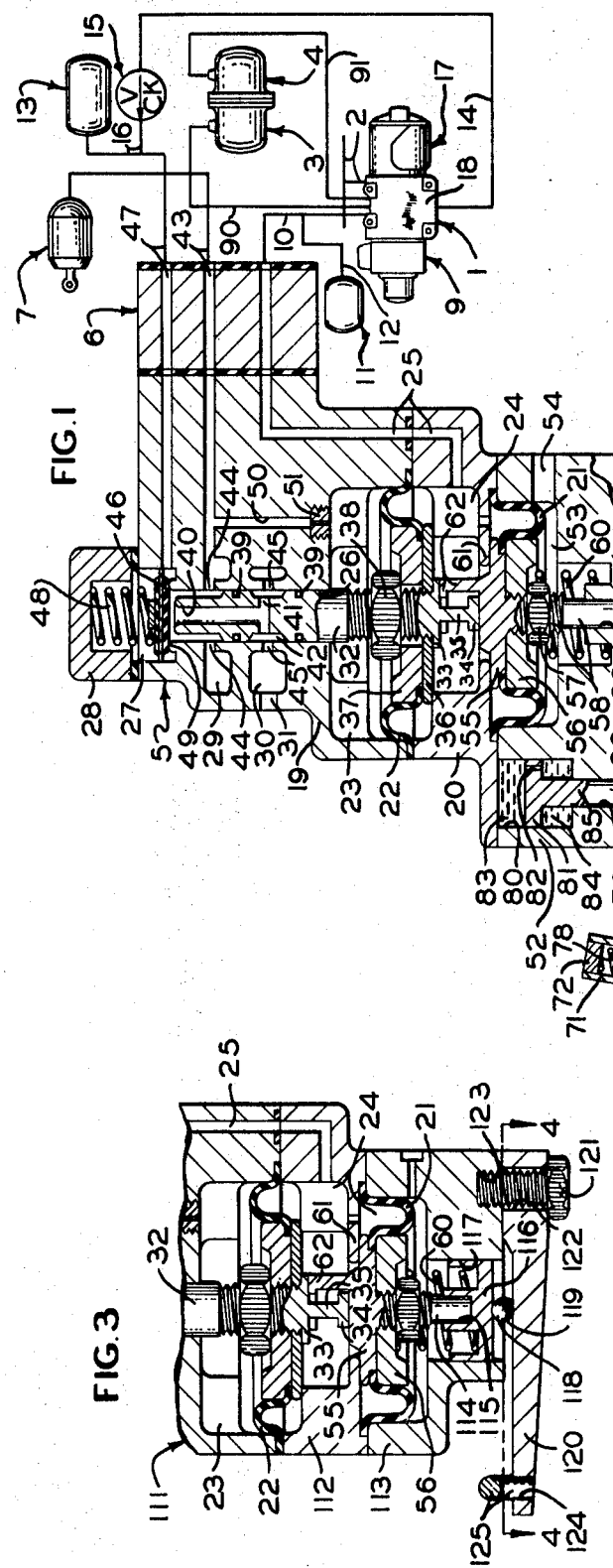
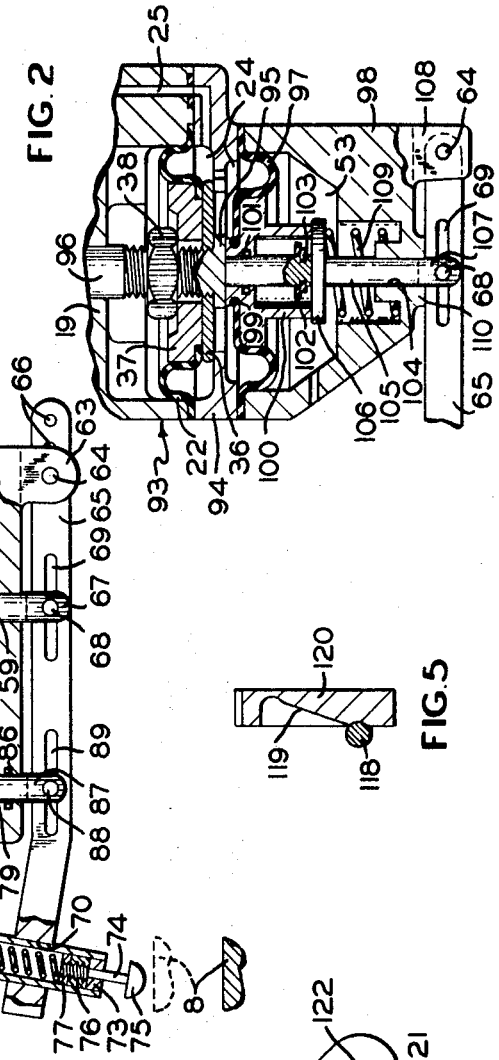
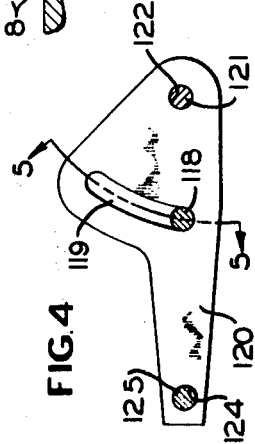
INVENTOR.
DANIEL G. SCOTT
BY *Ralph W. McIntire, Jr.*
ATTORNEY

United States Patent Office 3,606,485
Patented Sept. 20, 1971

3,606,485
EMPTY-LOAD RELAY VALVE DEVICE
Daniel G. Scott, Apollo, Pa., assignor to Westinghouse
Air Brake Company, Wilmerding, Pa.
Filed Dec. 29, 1969, Ser. No. 888,583
Int. Cl. B60t 8/18
U.S. Cl. 303—23    15 Claims

ABSTRACT OF THE DISCLOSURE

This invention relates to a railway vehicle relay valve device for interposition between a brake control pipe and a brake cylinder and includes a mechanism adjustable according to the load carried by the vehicle to so condition the relay valve device that its operation by fluid under pressure from the brake control pipe always provides a supply of fluid pressure to the brake cylinder, the value of which is in accordance with the weight of the load carried by a spring-supported (or sprung) part of the vehicle between which and an unsprung part, the relay valve device is interposed for effecting operation of the load-measuring mechanism thereof in accordance with changes in the load carried by the spring-supported part.

BACKGROUND OF THE INVENTION

The empty and load brake control apparatus heretofore known for railway vehicles has usually comprised, in addition to a relay valve device, a brake control change-over valve device carried by the body of the vehicle and a load-measuring or strut cylinder device which is usually installed on the end of a truck bolster and connected by flexible conduits to the change-over valve device since the truck bolster constitutes a part of the vehicle truck and therefore, turns relative to the vehicle body as the vehicle travels around a curve. The initial cost of such empty and load brake control apparatus is relatively high, and the maintenance cost, including that of the conduits connecting the change-over valve device and the strut cylinder, is often prohibitive.

Accordingly, it is the general purpose of this invention to provide a simple and inexpensive empty and load brake apparatus in which the functions of a change-over valve device and of a load-measuring strut cylinder device are performed by a differential type of fluid-pressure-operated relay valve device that includes a mechanism adjustable according to the load carried by the vehicle to so condition the relay valve device that is operation provides a braking force on the vehicle in accordance with the load carried thereby.

SUMMARY OF THE INVENTION

According to the present invention, there is provided a novel, simple and inexpensive relay valve device for use on railway vehicles that are always operated either empty or fully loaded. This relay valve device includes a load-measuring arm pivotally mounted at one end of the body of the relay valve device and movable to one or another position, accordingly as the vehicle is empty or loaded, to correspondingly provide either a rigid or a lost-motion connection between a pair of movable abutments of different effective area each time a brake application is effected to cause operation thereby of a self-lapping type of valve mechanism to be in correspondence with either the difference in the effective area of the pair of abutments or the effective area of the larger of the abutments to establish one degree of braking force for braking the vehicle while it is empty and a greater degree of braking force for braking it while it is loaded.

In the accompanying drawing:
FIG. 1 is a diagrammatic view, in outline, showing an empty and load railway vehicle brake equipment constructed in accordance with one embodiment of the invention, the relay valve device included in this equipment being shown in cross-section.
FIG. 2 is a partial diagrammatic view, in section, showing a relay valve device for the brake equipment shown in FIG. 1 constructed in accordance with a second embodiment of the invention.
FIG. 3 is a diagrammatic view, in section, showing a relay valve device provided with a manually operated change-over means.
FIG. 4 is a horizontal cross-sectional view, taken along the line 4—4 of FIG. 3 and looking in the direction of the arrows, showing further structural details of the manually operated change-over means not made apparent in FIG. 3.
FIG. 5 is a vertical cross-sectional view, taken along the line 5—5 of FIG. 4 and looking in the direction of the arrows showing the contour of a cam surface not made apparent in FIG. 4.

In FIG. 1 of the drawing, there is shown an empty and load fluid pressure brake equipment constructed in accordance with one embodiment of the invention. This empty and load fluid pressure brake equipment comprises a brake control valve 1 to which is connected the usual brake pipe 2, auxiliary reservoir 3, and emergency reservoir 4. The empty and load brake equipment shown in FIG. 1 further includes a double-diaphragm differential-type self-lapping relay valve device 5 having a pipe bracket 6 that is mounted by any suitable means (not shown) on a sprung part of a railway vehicle, and a brake cylinder 7. It will be understood that the other above-mentioned parts of the brake equipment are also mounted on a suitable sprung part of the vehicle which sprung part is movable vertically relative to a stop 8 carried on an unsprung part of a railway vehicle which unsprung part may be, for example, a side frame of the vehicle truck.

The brake control valve device 1 shown in FIG. 1 of the drawing is of the AB type which may be of substantially the same operating characteristics as the brake control valve device fully described in Pat. 2,031,213, issued Feb. 18, 1936 to Clyde C. Farmer, and assigned to the assignee of the present invention, in view of which it is deemed unnecessary to show and describe this valve device in detail.

Briefly, however, the brake control valve device 1 comprises a service portion 9 adapted to operate upon both a service and an emergency rate of reduction in pressure of fluid in brake pipe 2 for supplying fluid under pressure from the auxiliary reservoir 3 to a brake cylinder pipe 10 and to the relay valve device 5 connected thereto. A volume reservoir 11 is connected to the pipe 10 by a pipe 12 the purpose of this volume reservoir being to provide the proper equalization pressure between the auxiliary reservoir 3 and a control chamber in the relay valve device 5 when a brake application is effected. The relay valve device 5 is operated by the fluid under pressure thus supplied thereto, upon a service rate of reduction in brake pipe pressure, to effect the supply of fluid under pressure from a supply reservoir 13 to the brake cylinder 7, in a manner hereinafter described in detail, for effecting a service application of the brakes on the vehicle. The supply reservoir 13 is charged from the brake pipe 2 via the brake control valve 1, a pipe 14 connected to the inlet of a one-way flow check valve device 15, and a pipe 16 having one end connected to the outlet of the check valve device 15 and the other end connected to the supply reservoir 13.

The brake control valve device 1 also comprises an emergency portion 17 which is adapted to operate only upon an emergency rate of reduction in pressure of fluid in brake pipe 2 for supplying fluid under pressure from the emergency reservoir 4 to the pipe 10. This fluid under pressure thus supplied from the emergency reservoir 4 to the pipe 10, in addition to that provided in this pipe from auxiliary reservoir 3 by operation of the service portion 9, is adapted to operate the relay valve device 5 to provide a higher pressure in the brake cylinder device 7 to cause an emergency application of the brakes on the vehicle. Upon recharging the brake pipe 2, the brake control valve device 1 is adapted to operate to open the pipe 10 to atmosphere for releasing fluid under pressure therefrom and from volume reservoir 11 to cause the relay valve device 5 to operate to release fluid under pressure from the brake cylinder device 7 thereby releasing the brakes on the vehicle and at the same time to effect the recharging of the auxiliary reservoir 3, the emergency reservoir 4 and the supply reservoir 13 in the usual well-known manner. The service and emergency portions 8 and 17, resepectively, of the brake control valve device 1 are mounted on opposite faces of a pipe braket 18 to which all pipe connections to the valve device 1 are made, as shown in FIG. 1 of the drawing.

The double-diaphragm self-lapping relay valve device 5 comprises, as shown in FIG. 1, a sectionalized casing embodying two casing sections 19 and 20 and two coaxially arranged movable abutments or diaphragms 21 and 22 of different effective areas. The outer periphery of the larger diaphragm 22 is clamped between the casing sections 19 and 20 which are secured together by any suitable means (not shown).

The diaphragm 22 cooperates with the casing sections 19 and 20 and the diaphargm 21 to form within the relay valve device 5 and on opposite sides of the diaphragm 22, a pair of chambers 23 and 24. Opening into the chamber 24 is one end of a passageway 25 that extends through the casing sections 20 and 21 and the pipe bracket 6. The other end of this passage 25 has one end of the hereinbefore-mentioned pipe 10 connected thereto.

The casing section 19 of the above-mentioned sectionalized casing of the relay valve device 5 is provided with a bore 26 that at its upper end opens into a chamber 27 formed by the cooperative relationship between the upper end of the casing 19 and a cover member 28 secured to the casing section 19 by any suitable means (not shown). The opposite or lower end of the bore 26 opens into the chamber 23, and intermediate its ends this bore 26 opens into two spaced-apart annular chambers 29 and 30 provided in the casing section 19. The chamber 30 is open to atmosphere via a short passageway 31. Slidably mounted in the bore 26 is a valve stem 32 having at its lower end two spaced-apart collars 33 and 34 between which is a portion 35 of reduced diameter. Above the collar 33 is a screw-threaded portion of reduced diameter which extends through a diaphragm follower 36 and a diaphragm follower plate 37 and receives in screw-threaded engagement therewith a nut 38 whereby the inner periphery of the diaphragm 22 is clamped between the diaphragm follower 36 and diaphragm follower plate 37 to operatively connect the valve stem 32 to the diaphragm 22.

Above the nut 38 thereon the stem 32 is provided with two identical spaced-apart peripheral annular grooves in each of which is disposed an O-ring 39 that forms a seal with the wall surface of the bore 26 to prevent leakage of fluid under pressure between the periphery of the valve stem 32 and the wall of the bore 26, and from the chambers 29 and 23 to the atmospheric chamber 30.

The valve stem 32 is provided with a bottomed bore 40 and a cross-bore 41 the opposite ends of which opens onto a peripheral annular groove 42 formed on the stem 32 intermediate the two O-rings 39 carried thereby. The groove 42 is so located that, while the stem 32 occupies the position shown in FIG. 1, the brake cylinder 7 is open to atmosphere via a pipe and corresponding passageway 43, which opens into chamber 29, the chamber 29, a plurality of ports 44 that connect the chamber 29 to the interior of the bore 26, bore 26, bottomed bore 40, cross-bore 41, groove 42, a plurality of ports 45 formed in the casing 19 and connecting the interior of bore 26 to the chamber 30, the chamber 30 and the short passageway 31.

A flat disc-type valve 46 is disposed in the chamber 27, which is supplied with fluid under pressure from the supply reservoir 13 via the pipe 16 and a pipe and corresponding passageway 47. The valve 46 controls communication between the chamber 27 and the interior of bore 26 at the wall surface of which opens one end of the ports 44 the opposite ends of which open into chamber 29 that is connected by the passageway 43 and correspondingly numbered pipe to the brake cylinder 7.

A spring 48, interposed between the valve 46 and the cover member 28, urges the valve 46 downward for normally seating it against an annular valve seat 49 formed at the upper end of the bore 26.

The above-mentioned passageway 43 is connected by a passageway 50 provided in the casing section 19 to the chamber 23, there being a choke 51 disposed in this passageway 50 the size of which choke controls the rate of flow of fluid under pressure to and from the chamber 23.

The outer periphery of the smaller diaphragm 21 is clamped between the casing section 20 and a bottom cover member 52 which is secured to the casing section 20 by any suitable means (not shown) and which cooperates with the diaphragm 21 to form a chamber 53 which is open to atmosphere via a passageway 54 provided in this cover member 52.

The inner periphery of the smaller diaphragm 21 is clamped between a diaphragm follower 55 and an annular diaphragm follower plate 56 by a nut 57 that has screw-threaded engagement with a screw-threaded stem 58 formed integral with and extending from the lower side of the diaphragm follower 55 through the annular diaphragm follower plate 56. The length of the stem 58 is such that it extends through the chamber 53 and a bore 59 provided in the bottom cover member 52 to the exterior thereof.

A spring 60, disposed in the chamber 53 in surrounding relation to the stem 58, is interposed between the bottom cover member 52 and the diaphragm follower plate 56 for normally biasing the diaphragm follower 55 against a stop 61 formed integral with the casing section 20.

A lost-motion connection is provided between the diaphragms 21 and 22 by a forked portion or member 62 that is formed integral with and extends from the upper side of the diaphragm follower 55 so as to straddle the portion 35 of reduced diameter that connects the collars 33 and 34.

Formed integral with and extending downward from the bottom of the bottom cover member 52 at the right-hand end thereof are the parallel spaced-apart jaws of a clevis 63. As shown in FIG. 1, rockably mounted on a pin 64 that has its opposite ends anchored in the jaws of this clevis is one end of a load-weighing lever 65, it being noted that this end of the lever 65 is provided with a plurality of spaced-apart bores 66 for receiving the pin 64 to correspondingly vary the lever ratio of the lever 65 whereby the empty and load brake control apparatus constituting the present invention can be adapted for use on cars having different total spring deflections. The lever 65 extends between the jaws of a clevis 67 formed on the lower end of the stem 58 and is operatively connected thereto by a pin 68 that extends through an elongated slot 69 provided in this lever and has its opposite ends anchored in the jaws of the clevis 67.

As shown in FIG. 1, adjacent the left-hand end thereof the lever 65 is provided with a bore 70 which receives with a press-fit a sleeve member 71 the upper end of which receives with a press-fit a plug 72. Press-fitted into the lower end of the sleeve member 71 is an annular plug 73 through which extends with a sliding fit a rod 74 that has formed at its lower end a foot 75 and at its upper end screw-threads for receiving a cylindrical member 76 that has a sliding fit within the sleeve member 71 and a cylindrical lock nut 77 that locks the member 76 to the rod 74 to prevent the member 76 from rotating with respect to the rod 74 as the result of the vibration occurring while a railway vehicle is traveling at a high speed.

Disposed within the sleeve member 71 and interposed between the plug 72 and the lock nut 77 is a spring 78 which serves to normally bias the cylindrical member 76 against the annular plug 73.

The foot 75 is movable into abutting contact with the stop 8 in a manner hereinafter explained. This stop 8 may be a cross member or bar that extends crosswise of the car truck and has its opposite ends anchored to the two side frames of the car truck.

A lever cushioning means for the lever 65 is shown in FIG. 1 and comprises a bore 79 and a coaxial counterbore 80 provided in the bottom cover member 52, the counterbore 80 forming a cylinder in which is slidably mounted a piston 81 having a choked passageway 82 extending therethrough from one face to the other. The piston 81 cooperates with the casing section 20 and bottom cover member 52 to form on the respective opposite faces of the piston two chambers 83 and 84 which are filled with some suitable fluid such as, for example, oil prior to securing the bottom cover member 52 to the casing section 20.

As shown in FIG. 1, one end of a piston rod 85 is formed integral with and extends downward from the lower face of the piston 81 through the bore 79 the wall surface of which is provided with an internal groove in which is disposed an O-ring 86 that forms a sliding seal with the peripheral surface of the piston rod 85 to prevent leakage of fluid from the chamber 84.

As can be seen from FIG. 1, the lower end of the piston rod 85 is provided with a clevis 87 between the jaws of which is disposed the lever 65 that is pivotally connected thereto by a pin 88 that extends through an elongated slot 89 in the lever and corresponding coaxial bores in the jaws of the clevis.

OPERATION (FIG. 1) INITIAL CHARGING

In initially charging empty and load brake equipment shown in FIG. 1, fluid under pressure supplied to the brake pipe 2 by the usual brake valve (not shown) on the locomotive flows to the brake control valve device 1 and thence through this device and a pipe 90 to the auxiliary reservoir 3, and through a pipe 91 to the emergency reservoir 4, respectively, to effect charging of these reservoirs in the usual well-known manner. Fluid under pressure also flows from the brake pipe 2 through the brake control valve device 1 and the pipe 14, check valve device 15 and 16 to the supply reservoir 13 to effect charging of this reservoir.

It will be understood that at this time the brake cylinder 7 and the various chambers in the relay valve device 5 are devoid of fluid under pressure.

SERVICE APPLICATION OF THE BRAKES ON AN EMPTY VEHICLE

When it is desired to effect a service application of the brakes, the pressure in the brake pipe 2 will be reduced in the usual manner by operation of the brake valve on the locomotive to cause the brake control valve 1 to effect the supply of fluid under pressure from the auxiliary reservoir 3 to the pipe 10 which is connected by the passageway 25 to the chamber 24 in the relay valve device 5 and to the volume reservoir 11 which is connected to pipe 10 by the pipe 12. It will be understood that the volume of the volume reservoir 11 is such that the equalization pressure therein and in the chamber 24 is the same as that obtained in the pressure chamber of a conventional brake cylinder.

Fluid under pressure supplied to the chamber 24 in the manner described above acts on the effective area of the smaller diaphragm 21 to cause downward deflection of this diaphragm against the yielding resistance of spring 60. This deflection is effective via the stem 58, clevis 67 and pin 68 to rock the lever 65 counterclockwise about the pin 64. Since the vehicle may be assumed to be empty, the foot 75 is at a maximum distance from stop 8. Consequently, the downward deflection of the smaller diaphragm 21 will move the diaphragm follower 55 and forked member 62 downward until this forked member abuts collar 34 it being understood that the forked member 62 abuts the collar 34 just prior to or substantially at the same time that the foot 75 is moved into abutting relationship with the stop 8.

With the forked member 62 in abutting relationship with the collar 34, a rigid connection is provided between the larger diaphragm 22 and the small diaphragm 21. Accordingly, it is apparent that the fluid under pressure supplied to the chamber 24 in the manner described above acts in a downward direction on the effective area of the smaller diaphragm 21 and in an upward direction on the effective area of the larger diaphragm 22. Consequently, the fluid under pressure in the chamber 24 acts in an upward direction on an area equal to the difference in the effective areas of the diaphragm 22 and 21 to provide a force that moves the diaphragm stack comprising the diaphragms 21 and 22 and the valve stem 32 upward to first move the upper end of the valve stem 32 into contact with the lower side of valve 46 to close communication between the pressure chamber (not shown) in the brake cylinder device 7 and atmosphere. As the diaphragms 22 and 21 and stem 32 continue to be deflected upward, subsequent to movement of the upper end of the valve stem 32 into contact with the lower side of the valve 46, this valve will be moved upward away from the valve seat 49 against the yielding resistance of the spring 48.

Upon the unseating of valve 46 from the valve seat 49, fluid under pressure will flow from the supply reservoir 13 to the pressure chamber in the brake cylinder 7 shown in FIG. 1 via pipe 16, pipe and passageway 47, chamber 27, past unseated valve 46, bore 26, ports 44, chamber 29 and passageway and corresponding pipe 43.

Some of the fluid under pressure supplied to passageway 43 in the manner described above flows to the chamber 23 above the larger diaphragm 22 via the passageway 50 and the choke 51. The fluid under pressure thus supplied to the chamber 23 acts on the effective area of the larger diaphragm 22 in a direction opposite to the direction that the fluid under pressure supplied to the chamber 24 acts on an area equal to the difference in the effective area of the diaphragms 22 and 21 so that when the oppositely acting fluid pressure forces are substantially balanced, the spring 48 will be rendered effective to move the valve 46, stem 32 and diaphragm 22 downward to seat valve 46 on seat 49 to cut off flow of fluid under pressure from the supply reservoir 13 to the brake cylinder 7, it being understood that as the diaphragm 22 is thus deflected downward, the fluid under pressure present in the chamber 24 is rendered effective to deflect the diaphragm 21 downward and thereby maintain the forked member 62 in abutting relationship with the collar 34 thus maintaining the rigid connection between the diaphragms 22 and 21. From the foregoing, it is apparent that, since the effective area of the larger diaphragm 22 subject to the pressure of fluid in the chamber 23 is greater than the difference in the effective areas of the diaphragms 22 and 21 subject to the pressure in the chamber 24, the pressure supplied to the pressure chamber in the brake cylinder 7 and to the chamber 23 is less than the pressure supplied to the chamber 24 and in inverse ratio to the effective areas of the larger diaphragm 22 and the smaller diaphragm 21. It will be understood, however, that this pressure in the pressure chamber of the brake cylinder 7 provides an adequate braking force for an empty vehicle.

RELEASE OF A SERVICE APPLICATION ON AN EMPTY VEHICLE

When it is desired to effect a release of a service brake application, the pressure in the brake pipe 2 will be increased in the usual manner to cause the service slide valve (not shown) of the service portion 9 of the brake control valve 1 to be returned to its release position so that a communication is established therethrough from the chamber 24 in the relay valve device 5 to atmosphere. Consequently, all of the fluid under pressure present in the chamber 24 will be vented to atmosphere.

When all of the fluid underpressure in the chamber 24 is vented to atmosphere in the manner just described, the spring 60 is effective to return the smaller diaphragm 21, diaphragm follower 55, diaphragm follower plate 56, stem 58 and lever 65 to the position shown in FIG. 1.

As all of the fluid under pressure is released from the chamber 24 to atmosphere, the fluid under pressure present in the chamber 23 is rendered effective to deflect the diaphragm 22 downward to move the stem 32 to the position shown. Consequently, fluid under pressure will be released from the pressure chamber in the brake cylinder 7 to atmosphere via pipe and passageway 43, chamber 29, ports 44, bore 26, bottomed bore 40, cross-bore 41, groove 42, ports 45, chamber 30 and passageway 31 thereby releasing the brakes on the vehicle, it being understood that the fluid under pressure in the chamber 23 is simultaneously released to atmosphere since chamber 23 is connected to the passageway 43 via choke 51 and passageway 50.

SERVICE APPLICATION OF THE BRAKES ON A LOADED VEHICLE

Let it be supposed that the brake equipment shown in FIG. 1 has been charged in the manner hereinbefore described and that the vehicle is fully loaded.

The load on the vehicle is effective to compress the springs of the vehicle truck so that the sprung part that carries the relay valve device 5 is moved downward from the position it occupied while the vehicle was empty a distance proportional to the load carried by the vehicle. Consequently, the distance between the foot 75 and the stop 8 will decrease until, when the vehicle is fully loaded, the foot 75 will substantially abut the stop 8, or, in other words, the stop 8 will occupy, with respect to the foot 75, the position indicated by broken lines in FIG. 1. Therefore, when a service brake application is effected in the manner hereinbefore described and fluid under pressure is supplied to the pipe 10 and the volume reservoir 11, and thence to the chamber 24 in the relay valve device 5 via passageway 25, the smaller diaphragm 21 cannot be deflected downward to effect counterclockwise rocking of the lever 65 about the pin 64. Consequently, the diaphragm follower 55 and forked portion 62 integral therewith will remain in the position shown in FIG. 1 in which diaphragm follower 55 abuts the stop 61.

The fluid under pressure supplied to the chamber 24 acts in an upward direction on the entire effective area of the larger diaphragm 22 to deflect this diaphragm in the direction to first move the valve stem 32 upward to the position in which the upper end thereof abuts the lower face of the valve 46 to close communication between the pressure chamber in the brake cylinder 7 and atmosphere, and thereafter effect unseating of the valve 46 from the valve seat 49 whereupon fluid under pressure flows from the supply reservoir 13 to the pressure chamber in the brake cylinder 7 to effect a service brake application.

Fluid under pressure supplied to the brake cylinder 7 also flows to the chamber 23 above the larger diaphragm 22 via passageway 50 and choke 51 where it acts in a downward direction over the effective area of this diaphragm. Consequently, when the pressure in the chamber 23 is increased to substantially the same value as that in the chamber 24, the opposing fluid pressure forces acting on the diaphragm 22 will be balanced whereupon the spring 48 will effect reseating of the valve 46 on its seat 49 to cut off further supply of fluid under pressure to the pressure chamber in the brake cylinder 7 and the chamber 23.

Since fluid under pressure is supplied to the chamber 23 until it substantially equals the pressure in the chamber 24, it is apparent that this pressure which is the same as that in the pressure chamber of the brake cylinder 7, provides for a greater braking force on the loaded vehicle than is provided for an empty vehicle.

It should be noted that the above-described upward deflection of the large diaphragm 22 to effect unseating of the valve 46 to effect the supply of fluid under pressure to the pressure chamber of the brake cylinder 7 to cause a brake application on the loaded vehicle does not move the collar 34 upward far enough for this collar to abut the forked member 62. Consequently, there is a lost-motion connection between the diaphragm 22 and 21 when the relay valve device 5 operates while the vehicle is loaded to cause a service brake application on the vehicle.

RELEASE OF A SERVICE APPLICATION OF BRAKES ON A LOADED VEHICLE

To release a service brake application on a loaded vehicle, the pressure in the brake pipe 2 is increased to its normal charged value to cause the brake control valve 1 to return to its release position whereupon all fluid under pressure in the chamber 24 in the relay valve device 5 is vented to atmosphere in the manner hereinbefore described.

As fluid under pressure is released from the chamber 24, the relay valve device 5 operates in the manner hereinbefore described to release all fluid under pressure in the pressure chamber of the brake cylinder 7 to atmosphere thereby releasing the service brake application on the loaded vehicle.

EMERGENCY APPLICATION AND RELEASE OF BRAKES

An emergency brake application on both an empty and a loaded vehicle differs from a service brake application only in that when an emergency brake application is effected, fluid under pressure is supplied from both the auxiliary reservoir 3 and the emergency reservoir 4 to the chamber 24 in the relay valve device 5 and to the volume reservoir 11. By supplying fluid under pressure from both the auxiliary reservoir 3 and the emergency reservoir 4, a higher equalization pressure is obtained in the chamber 24 and volume reservoir 11 and, therefore, a higher pressure is established in the pressure chamber of the brake cylinder 7. This higher braking pressure in the pressure chamber of the brake cylinder 7 causes a higher braking force to be transmitted by this brake cylinder 7 to the brake shoes (not shown) for pressing the brake shoes against the tread surface of the vehicle wheels.

The release of an emergency brake application on either an empty or a loaded vehicle is identical to the release of a service brake application except that the emergency reservoir 4 as well as the auxiliary reservoir 3 is recharged from the brake pipe 2 to the normal fully charged pressure carried therein.

DESCRIPTION (FIG. 2)

In FIG. 2 of the drawing, there is shown a partial diagrammatic view of a relay valve device 93 constructed in accordance with a second embodiment of the invention, it being understood that the remainder of this relay valve device 93 is identical in construction to the relay valve device 5 shown in FIG. 1. According to this second embodiment of the invention, the relay valve device 93 shown in FIG. 2 differs from the relay valve device 5 shown in FIG. 1 in the construction of the lost-motion connection between the two diaphragms of unequal effective area. Accordingly, like reference numerals have been used to designate the structure shown in FIG. 2 which is identical to that shown in FIG. 1. Only such features of the structure and operation of the embodiment of the invention shown in FIG. 2 which differ from that of the embodiment of FIG. 1 will be hereinafter described.

According to the embodiment of the invention disclosed in FIG. 2, an empty and load brake equipment is identical to that shown in FIG. 1 except that the relay valve 93 shown in FIG. 2 differs from the relay valve device 5 shown in FIG. 1 in the construction of the lost-motion tical to that shown in FIG. 1 except that the relay valve device 93 shown in FIG. 2 replaces the relay valve device 5 shown in FIG. 1.

As shown in FIG. 2, the outer periphery of the diaphragm 22 is clamped between the casing section 19 and a casing section 94 which replaces the casing section 20 shown in FIG. 1. The inner periphery of the diaphragm 22 is clamped between the diaphragm follower 36, which rests against a collar 95 formed intermediate the ends of a valve stem 96 which replaces the valve stem 32 shown in FIG. 1, and the diaphragm follower plate 37 by the nut 38 which has screw-threaded engagement with screw threads provided on the valve stem 96 above the collar 95 thereon.

The outer periphery of a diaphragm 97, which replaces the smaller diaphragm 21, is clamped between the casing section 94 and a bottom cover member 98 which is secured to the casing section 94 by any suitable means (not shown) and which cooperates with the diaphragm 97 to form the atmospheric chamber 53.

As shown in FIG. 2, the inner periphery of the diaphragm 97 is provided with a bead 99 that is disposed in a peripheral annular groove formed in an annular diaphragm follower 100 which is slidably disposed about the portion of the valve stem 96 below the collar 95 thereon and is provided with an annular groove in which is disposed an O-ring 101. This O-ring 101 forms a sliding seal with the peripheral surface of that portion of the valve stem 96 below the collar 95 thereon to prevent leakage of fluid under pressure from the chamber 24 to the atmospheric chamber 53.

The valve stem 96 adjacent its lower end is provided with a peripheral annular groove into which, after this lower end of the valve stem 95 is inserted through the annular diaphragm follower 100 and an annular washer 102, is introduced a snap ring 103. Accordingly, it will be apparent from FIG. 2 that upon the supply of fluid under pressure to the chamber 24 while the vehicle is empty, the diaphragms 22 and 97 are movable away from each other until the annular diaphragm follower 100 abuts the washer 102.

The bottom cover member 98 is provided with a bore 104 through which extends a stem 105 that is provided with an out-turned flange 106 at its upper end and with a clevis 107 at its lower end. The lever 65 extends between the jaws of the clevis 107 and is operatively connected thereto by the pin 68 that extends through the elongated slot 69 in this lever and has its opposite ends anchored in the jaws of this clevis 107.

As shown in FIG. 2, formed integral with the bottom cover 98 is a clevis 108 in the opposite jaws of which are anchored the opposite ends of the pin 64 upon which the lever 65 is rockably mounted.

A spring 109, disposed in the chamber 53 in surrounding relation to the stem 105, is interposed between the bottom cover member 98 and the flange 106 for normally biasing the diaphragm 97, diaphragm follower 100, stem 105 and lever 65 to the position shown in FIG. 2 in which the lever 65 abuts a boss 110 formed on the bottom cover member 98 at the lower end of the bore 104 therein.

OPERATION (FIG. 2)

Considering an empty and load railway vehicle brake equipment to be the same as that shown in FIG. 1 except that the relay valve device 93 shown in FIG. 2 is substituted for the relay valve device 5 shown in FIG. 1, it will be understood that when a service brake application is effected, while the vehicle is empty, the fluid under pressure supplied by the brake control valve 1 to the chamber 24 is effective to deflect the diaphragm 97 downward against the yielding resistance of spring 109 and rock the lever 65 counterclockwise about pin 64 until the foot 75 substantially abuts the stop 8. It will be understood that the annular diaphragm follower 100 will abut the washer 102 just prior to or substantially at the same time as the foot 75 is moved into abutting relationship with the stop 8 thus providing a rigid connection between the larger diaphragm 22 and the smaller diaphragm 97.

The fluid under pressure present in the chamber 24 will now act in opposite directions on the effective area of the diaphragms 22 and 97 to operate the relay valve device 93 in the same manner as has been hereinbefore described for the relay valve device 5 while the vehicle is empty to supply fluid under pressure to the pressure chamber of the brake cylinder 7 to provide an adequate braking force for an empty vehicle.

It will be further understood from FIG. 2 that when a service brake application is effected, while the vehicle is loaded, the fluid under pressure supplied to the chamber 24 is ineffective to deflect the diaphragm 97 downward from the position shown in FIG. 2. Consequently, the fluid under pressure supplied to the chamber 24 acts in an upward direction on the effective area of the diaphragm 22 to operate the relay valve device 93 in the same manner as has been hereinbefore described for the relay valve device 5, while the vehicle is loaded, to supply fluid under pressure to the pressure chamber of the brake cylinder 7 to provide an adequate braking force for a loaded vehicle.

A brake release on both an empty and on a loaded vehicle can be effected in the same manner as hereinbefore described for the first embodiment of the invention.

Furthermore, an emergency brake application and a subsequent brake release of the brake equipment constituting the second embodiment of the invention can be effected in the same manner as hereinbefore described for the first embodiment of the invention shown in FIG. 1.

DESCRIPTION (FIGS. 3, 4 AND 5)

In FIG. 3 of the drawing, there is shown a partial diagrammatic view of a relay valve device 111 provided with manually operated change-over means to condition it, when used in place of the relay valve device 5 shown in FIG. 1, to provide a minimum pressure in the pressure chamber of the brake cylinder 7 while the vehicle is empty, and a maximum pressure in the pressure chamber of the brake cylinder 7 while the vehicle is loaded. The relay valve device 111, which constitutes a third embodiment of the invention, differs from the relay valve device 5 shown in FIG. 1 in that the load weighing lever 65 is omitted. Furthermore, the casing section 20 and bottom cover member 52 of the relay valve device 5 are replaced by a casing section 112 and a bottom cover member 113 respectively, between which the outer periphery of the smaller diaphragm 21 is clamped.

As shown in FIG. 3, a stem 114, shorter than the stem 58 shown in FIG. 1, is formed integral with the diaphragm follower 55 and has its lower end disposed in a bottomed bore 115 provided in a cup-shaped spring seat 116. The spring seat 116 is slidably mounted in a bore 117 provided in the bottom cover member 113 and the spring 60 is interposed between the diaphragm follower plate 56 and this spring seat to bias a ball or cam roller 118 against a cam surface 119 having a detent at each end thereof. This cam surface 119 is provided in the upper surface of a manually operated change-over lever 120 that is pivotally mounted on the bottom of the bottom cover member 113 by a cap screw 121 that extends through a smooth bore 122 provided in the right-hand end of the change-over lever 120 and has screw-threaded engagement with the screw threads of a screw-threaded bottomed bore 123 provided in the bottom cover member 113.

As shown in FIGS. 4 and 5, the cam surface 119 provided in the upper surface of the change-over lever 120 is arcuate in shape and is sloped or tapered from one end to the other. Adjacent its left-hand end, the change-over lever 120 is provided with a bore 124 for receiving the hooked end of a pull rod 125 by which a trainman may manually rotate the change-over lever 120 from a load position in which it is shown in FIGS. 3, 4 and 5 in which the cam roller 118 abuts the lower end of the cam surface 119, as viewed in FIGS. 4 and 5, to an empty position (not shown) in which the cam roller 118 abuts the upper end of this cam surface 119.

It can be seen from FIG. 3 that, while the change-over lever 120 occupies the load position shown, the lower end of the stem 114 abuts the lower end of the bottomed bore 115 in the spring seat 116 and the diaphragm follower 55 abuts the stop 61. Consequently, the forked member 62 abuts the collar 33 on the valve stem 32 to provide the hereinbefore-mentioned lost-motion connection between the diaphragms 22 and 21. Therefore, when the brake control valve 1 operates to supply fluid under pressure to the chamber 24, to effect a service brake application while the vehicle is loaded the relay valve device 111 will operate in the same manner as hereinbefore described for the relay valve device 5 to supply fluid under pressure to the pressure chamber of the brake cylinder 7 and to the chamber 23 until the pressure therein is substantially the same as that in the chamber 24. Consequently, the fluid under pressure supplied to the pressure chamber of the brake cylinder 7 provides a braking force that is adequate to brake the fully loaded vehicle.

To condition the relay valve device 111 to provide a fluid presure in the pressure chamber of the brake cylinder 7 that will insure the proper braking force for an empty vehicle, a trainman will exert a pull on the pull rod 125 to effect counter-clockwise rocking of the change-over lever 120 from the load position in which it is shown in FIG. 4 to an empty position defined by the ball or roller 118 reaching the opposite or upper end of the cam surface 119.

It will be understood from FIGS. 3 and 5 that as the roller 118 rolls along the cam surface 119, the spring 60 is rendered effective to move the spring seat 116 downward relative to the bottom cover member 113 and stem 114 a distance equal to the distance between the forked member 62 and the collar 34.

Consequently, when the brake control valve 1 operates to supply fluid under pressure to the pressure chamber 24 while the change-over lever 120 occupies the empty position, this fluid under pressure is effective on the upper side of the effective area of the small diaphragm 21 to deflect this diaphragm in a downward direction and thereby move diaphragm follower 55 and forked member 62 downward until the forked member 62 abuts the collar 38 thereby providing a rigid connection between the diaphragms 22 and 21. Thereafter, the fluid under pressure present in the chamber 24 operates the relay valve device 111 in accordance with the difference in the effective area of the larger diaphragm 22 and smaller diaphragm 21 to effect the supply of fluid under pressure to the pressure chamber of the brake cylinder 7 to establish a fluid pressure therein that will provide a braking force that is adequate to properly brake the empty vehicle.

It should be understood that a brake release, subsequent to effecting a brake application on both an empty vehicle and on a loaded vehicle provided with a brake equipment that includes the relay valve device 111 (FIGS. 3, 4 and 5) instead of the relay valve device 5 (FIG. 1) is effected in the same way as hereinbefore described for the brake equipment including the relay valve device 5.

Furthermore, an emergency brake application and a subsequent brake release on a vehicle provided with a brake equipment that includes the relay valve device 111 (FIGS. 3, 4 and 5) in lieu of the relay valve device 5 (FIG. 1) is effected in the same manner as has been hereinbefore described for the brake equipment including the relay valve device 5.

It will be understood that subsequent to removing the load from a vehicle provided with a brake equipment including the relay valve device 111, or loading the empty vehicle, the change-over lever 120 will be manually moved to the proper position prior to hauling the vehicle in a train.

Having now described the invention, what I claim as new and desire to secure by Letters Patent is:

1. For interposition between a brake control pipe and a brake cylinder for effecting a brake application on a vehicle, an empty-load relay valve device comprising:
  (a) a pair of spaced-apart movable abutments of different effective area,
  (b) means selectively operable to provide, only while the vehicle is empty, a rigid connection between said pair of abutments, and, only while the vehicle is loaded, a lost-motion connection between said abutments,
  (c) a control chamber formed between the adjacent sides of said abutments,
  (d) a fluid pressure supply chamber to which a source of fluid under pressure is connected,
  (e) a delivery chamber at the opposite side of the larger of said abutments for connection to the brake cylinder,
  (f) valve means having an operating stem connected to the larger of said abutments, said valve means being operable by one of said abutments, while said selective means provides one of said connections therebetween, to effect the supply of fluid under pressure from said supply chamber and control pipe to said delivery chamber and brake cylinder to establish therein one degree of fluid pressure in response to the supply of fluid under pressure to said control chamber, and operable by said pair of abutments, while said selective means provides the other of said connections therebetween, to effect the supply of fluid under pressure from said supply chamber and control pipe to said delivery chamber and brake cylinder to establish therein a different degree of fluid pressure in response to the supply of fluid under pressure to said control chamber, and
  (g) a lever having one end pivotally mounted on the relay valve device, said lever being movable to one position, when the vehicle is empty, to render said selective means operable to provide said rigid connection between said abutments for reducing the fluid pressure force to effect operation of said valve means to a value corresponding to the difference in the effective area of said pair of abutments in response to the supply of fluid under pressure to said control chamber, and movable to another position, when the vehicle is loaded, to render said selective means operable to provide said lost-motion connection between said pair of abutments for increasing the fluid pressure force to effect operation of said valve means to a value corresponding to the effective area of the larger of said pair of abutments in response to the supply of fluid under pressure to said control chamber.

2. An empty-load relay valve device, as recited in claim 1, further characterized in that said lever intermediate its ends is operably connected to the smaller of said pair of abutments whereby said lever is rockable in one direction about said one end in response to the supply of fluid under pressure to said control chamber, and by means for effecting rocking of said lever in an opposite direction in response to the subsequent release of said fluid under pressure from said control chamber.

3. A relay valve device, as recited in claim 2, further characterized by a cushioning means for said lever, said cushioning means comprising:
   (a) a cylinder carried by the relay valve and having a bore therein,
   (b) a piston having a choked passageway connecting its opposite faces and being slidably mounted in said bore,
   (c) link means connecting said piston to said lever, and
   (d) fluid disposed in said bore on each side of said piston, said fluid being displaceable from one face of said piston to the other via said choked passageway in response to rocking of said lever in either direction.

4. A relay valve device, as recited in claim 1, further characterized by a cam roller carried by said selective means, and a cam surface formed on said lever and constantly in contact with said roller, the contour of said cam surface being such that upon movement of said lever to said one position said selective means provides said rigid connection between said abutments, and upon movement of said lever to said another position said selective means provides said lost-motion connection between said abutments.

5. A relay valve device, as recited in claim 4, further characterized by manually operated means for moving said lever from either of its two positions to the other.

6. A relay valve device, as recited in claim 4, further characterized in that said cam surface is provided with a detent at each end thereof for receiving said cam roller.

7. A relay valve device, as recited in claim 1, further characterized in that said lever comprises:
   (a) an arm member pivotally mounted at one end on a sprung part of the vehicle,
   (b) a hollow cylindrical member carried adjacent the other end of said arm member,
   (c) a contact plunger slidably carried in said hollow cylindrical member for contacting an unsprung part of the vehicle, and
   (d) resilient biasing means carried within said hollow cylindrical member for biasing said plunger toward one end of said hollow cylindrical member.

8. A relay valve device, as recited in claim 1, further characterized in that said selective means comprises:
   (a) a second stem carried by the larger of said abutments,
   (b) an annular follower member disposed about said second stem and secured to the smaller of said abutments, and
   (c) stop means carried by said second stem for limiting movement of said follower member and the smaller of said abutments in the direction away from said larger abutment in response to the supply of fluid under pressure to said control chamber.

9. A relay valve device, as recited in claim 8, further characterized by an impositive connection between said follower member and said pivoted lever.

10. A relay valve device, as recited in claim 9, further characterized in that said impositive connection comprises:
   (a) a link having a flange formed at one end thereof and its opposite end operatively connected to said pivoted lever intermediate the ends thereof, and
   (b) biasing means for normally biasing said flange into abutting relationship with said follower member.

11. A relay valve device, as recited in claim 8, further characterized by second stop means carried by said second stem for limiting movement of said follower member and the smaller of said abutments in the direction toward the larger of said abutments, and resilient means normally biasing said follower member against said second stop.

12. A relay valve device, as recited in claim 1, further characterized by stop means limiting movement of each of said abutments in the direction of the other, and means normally biasing the smaller of said abutments against said stop means.

13. For interposition between a brake control pipe and a brake cylinder for effecting a brake application on a vehicle having an unsprung part and a sprung part movable toward and away from the unsprung part respectively in accordance with an increase or a decrease in the load on the sprung part, a relay valve device carried by said sprung part and comprising:
   (a) a pair of spaced-apart movable abutments of different effective area,
   (b) means selectively operable to provide, only while the vehicle is empty, a rigid connection between said pair of abutments, and only while the vehicle is loaded a lost-motion connection between said abutments,
   (c) means cooperating with said pair of abutments to provide a delivery chamber on one side of the larger of said abutments for connection to the brake cylinder, a control chamber between the adjacent sides of said abutments, and an atmospheric chamber on the other side of the smaller of said abutments,
   (d) valve means comprising:
     (i) a hollow operating stem connected at one end to the larger of said abutments and being provided at the opposite end with an annular exhaust valve seat,
     (ii) an annular supply valve seat,
     (iii) a fluid pressure supply chamber to which a source of fluid under pressure may be connected, and
     (iv) a flat disc-type valve disposed in said supply valve chamber for cooperation with said annular valve seats and operable via said operating stem by fluid under pressure acting on the effective area of only the larger of said abutments, while said selective means provides said lost-motion connection between said abutments, to effect the supply of fluid under pressure from said supply chamber to said delivery chamber and brake cylinder to establish therein a maximum degree of fluid pressure in response to the supply of fluid under pressure to said control chamber, and operable via said operating stem by fluid under pressure acting in respective opposite directions on the effective area of each of said abutments, while said selective means provides said rigid connection between said abutments, to effect the supply of fluid under pressure from said supply chamber to said delivery chamber and brake cylinder to establish therein a minimum degree of fluid pressure in response to the supply of fluid under pressure to said control chamber,
   (e) a stop carried by the unsprung part of the vehicle, and
   (f) load measuring means carried by the sprung part of the vehicle and comprising:
     (i) a lever pivoted at one end on the sprung part of the vehicle,
     (ii) link means operably connected at one end to said lever intermediate the ends thereof and at the other end to the smaller of said abutments for effecting rocking of said lever in one direction until the other end of said lever abuts said stop in response to the supply of fluid under pressure to said control chamber, the degree of rocking of said lever accordingly as the vehicle is empty or loaded rendering said selective means operable to correspondingly provide either said rigid or said lost-motion connection between said pair of abutments.

14. A relay valve device, as recited in claim 13, further characterized by biasing means effective to rock said lever in a direction opposite said one direction in response to the release of fluid under pressure from said control chamber to move said other end of said lever out of abutting relationship with said stop.

15. A relay valve device, as recited in claim 14, further characterized by stop means for limiting rocking of said lever in said direction opposite said one direction.

References Cited

UNITED STATES PATENTS

| | | | |
|---|---|---|---|
| 2,940,799 | 6/1960 | Seger | 303—23X |
| 3,300,255 | 1/1967 | Racki | 303—22 |
| 3,376,080 | 4/1968 | Kettering et al. | 303—22 |
| 3,425,752 | 2/1969 | Pollinger et al. | 303—22X |

MILTON BUCHLER, Primary Examiner

J. J. McLAUGHLIN, Assistant Examiner

U.S. Cl. X.R.

303—22